United States Patent Office 3,666,332
Patented May 30, 1972

3,666,332
SELF-ALIGNING THRUST BUSHING ASSEMBLY
Keith W. Kampert, Libertyville, and Kenneth E. Houtz, Streamwood, Ill., assignors to International Harvester Company, Chicago, Ill.
Original application July 1, 1966, Ser. No. 562,266, now Patent No. 3,434,766, dated Mar. 25, 1969. Divided and this application Aug. 26, 1968, Ser. No. 778,878
Int. Cl. F16c 17/06
U.S. Cl. 308—135          5 Claims

ABSTRACT OF THE DISCLOSURE

A self-aligning bushing assembly for carrying axial loads between two relatively rotating plane surfaces secured for rotation by a pin extending through openings in the surfaces. An annular bearing member positioned adjacent one surface, an annular resilient member of elastomeric composition secured between the bearing member and the other surface, and means for moving the surfaces toward each other to facilitate adjustment upon assembly and thereafter to compensate for wear.

---

This application is a division of applicants' copending application Ser. No. 562,266, filed July 1, 1966.

This invention relates to a self-aligning bushing assembly adapted to carry thrust loads between two plane surfaces disposed in substantially parallel, spaced-apart relationship.

The thrust bushing assembly of this invention has general application as a load carrying member between two plane surfaces which are substantially parallel and adapted for relative rotation about an axis perpendicular to the surfaces. Examples of embodiments of this invention include the thrust bushings for the center hinge of an articulated vehicle, and for the bolster, or swivel support, for the rear axle of a vehicle. Among the problems encountered in these embodiments are: "dynamic misalignment" of the interconnected plane surfaces arising from fabrication errors, the requirement for the hinge or swivel to carry combined radial and axial loads of a large order, and the desirability of providing axial growth in the bushing assembly to adjust for wear and to facilitate assembly.

Accordingly, it is an object of the present invention to provide a thrust bushing assembly adapted to carry axial loads between two relatively rotating plane surfaces wherein the bushing assembly automatically compensates for misalignment between the surfaces and the bushing assembly.

Another object is to provide a self-aligning thrust bushing assembly for supporting substantially parallel surfaces mounted for rotation about a common axis in which the bushing assembly includes a bearing member mounted upon an annular resilient member of elastomer composition to maintain a coplanar alignment between the bearing member and the surfaces.

Another object is to provide a self-aligning thrust bushing assembly for supporting two relatively rotating parallel surfaces in which the assembly is simple in construction, reliable in operation, provides automatic coplanar alignment of the surfaces relative to the bushing, and may undergo selective axial growth to compensate for wear in the surfaces and to facilitate assembly.

These and other objects and advantages of the present invention will best be understood by reference to the following specification and accompanying drawings in which:

FIG. 1 is a side elevation cross sectional view illustrating a preferred embodiment of the pin assembly; and FIG. 2 is a side elevation cross sectional view illustrating an other embodiment of the pin assembly.

FIG. 1 illustrates an embodiment of the present invention in which the flexible means comprises a pair of elastomer members to compensate for misalignment of the support surfaces and to carry axial thrust loads. In this embodiment the rear frame section 116 and the front frame section 118 of an articulated vehicle are pivotally connected by means of the center pin assembly 120. FIG. 1 illustrates an upper pin assembly which would be in vertical registry with a lower pin assembly (not shown) comprising a simple clevis arrangement carrying only radial loads. The support for the pin assembly is a clevis on the rear frame section having a pair of vertically spaced arms 122 and 124. The support on the front frame section is a tongue 126 interleaved with the arms.

The center pin assembly 120 comprises an upper pin member 128 fitted in bore 127 formed in arm 122 and having an enlarged head portion 129 positioned within bore 131 formed in arm 124. The pin member is secured by means of the nut 130 and washer 132. Flange member 134, boss 135, and retaining bolt 136 are provided to lock the pin member with respect to the clevis.

Any suitable bearing, such as spherical bearing 138, may be provided to carry radial loads between the tongue and clevis members. Although a spherical bearing is illustrated it is understood that sleeve bearings, such as the type described in applicants' copending application, Ser. No. 562,266, filed July 1, 1966, may be utilized. The spherical bearing comprises a ball portion 140 pivotally mounted within the ring portion 142. The ball portion is secured to the shank of pin 128 and the ring portion is fitted within vertical bore 144 formed in the tongue member 126.

A pair of flexible thrust bushing assemblies 146 and 148 are provided to carry vertical loads between the frame sections. The upper bushing assembly 146 comprises an annular bearing member 150 concentric with the pin 128 and in coplanar surface contact with the upper surface of tongue 126. An annular resilient member 152, which may be formed of an elastomer material such as rubber, is bonded at one side to the upper surface of bearing member 150 and is fitted around the pin 128 in contact with the arm 122. The bushing assembly 148 is similar in construction to, but inverted from, the bushing assembly 146 and comprises an annular bearing member 154 concentric with the pin and in coplanar surface contact with the lower surface of tongue 126. An annular resilient member 156 is bonded at one side to the bearing member 154 while its other side contacts the surface of the head portion 129.

Annular sealing lips 158 and 160 are integral with respective resilient members 152 and 156 and project around the periphery of the bearing members 150 and 154 in sealing contact with a respective surface of the tongue member 126.

Wear of the bearing members 150 and 154 may be taken up by tightening the nut 130 on the pin 128. This will reduce the clearance between the bushing assemblies and the tongue.

FIG. 2 illustrates another embodiment of the present invention in which a single thrust bushing utilizing a resilient material is provided to automatically compensate for a non-parallel condition of the support surfaces. For this modification the lower pin assembly illustrated would be in vertical registry with an upper pin assembly (not shown) identical in construction to, but inverted from, the pin assembly described.

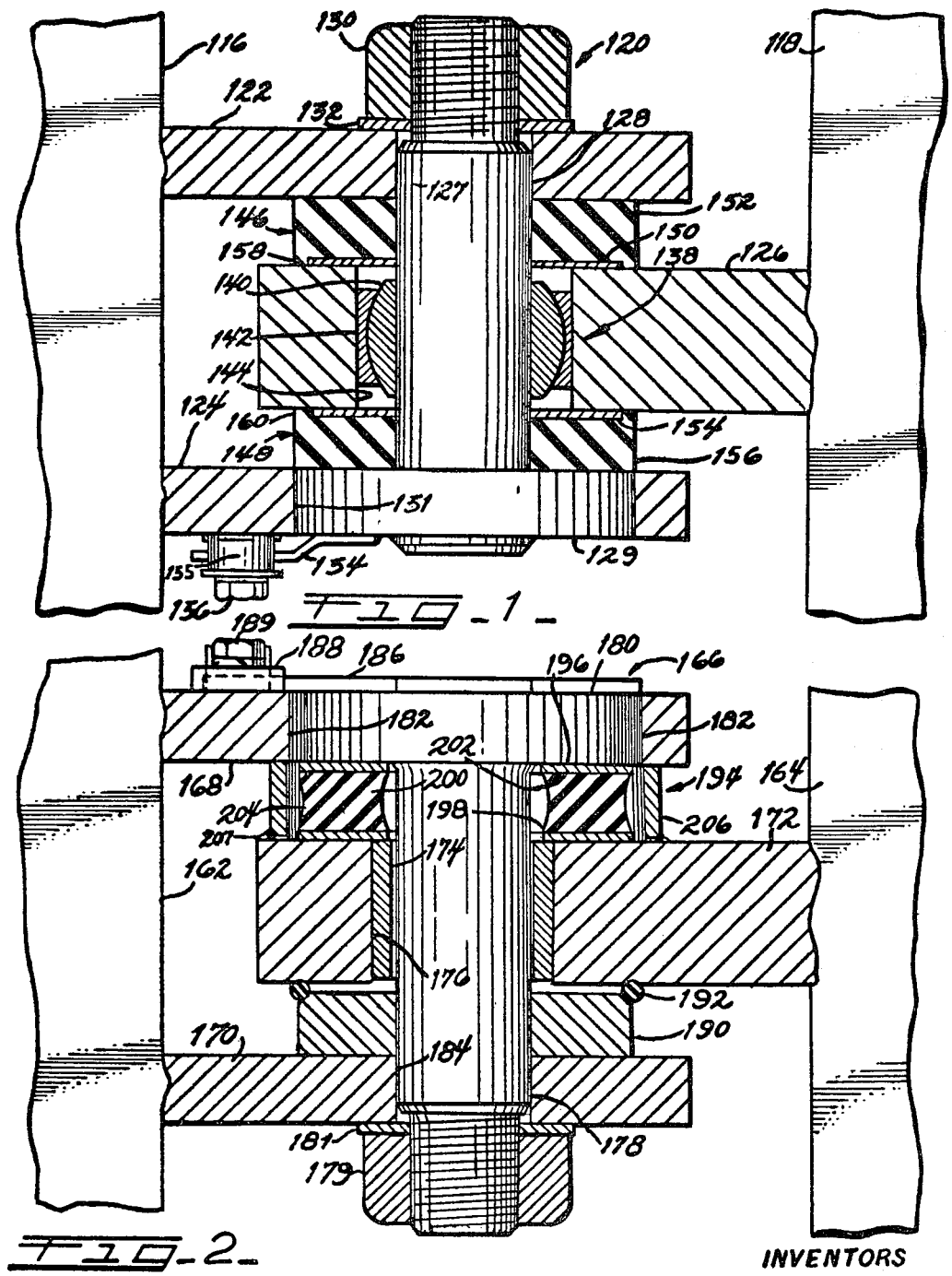

The rear frame section 162 is articulated to the front section 164 by means of the lower pin assembly 166. The pin assembly is supported by the rear frame section through a clevis comprising a pair of vertically spaced arms 168 and 170. The front frame section supports the